J. W. OSWALD.
DEVICE FOR SHARPENING LAWN MOWERS.
APPLICATION FILED AUG. 11, 1915.
1,183,224.
Patented May 16, 1916.
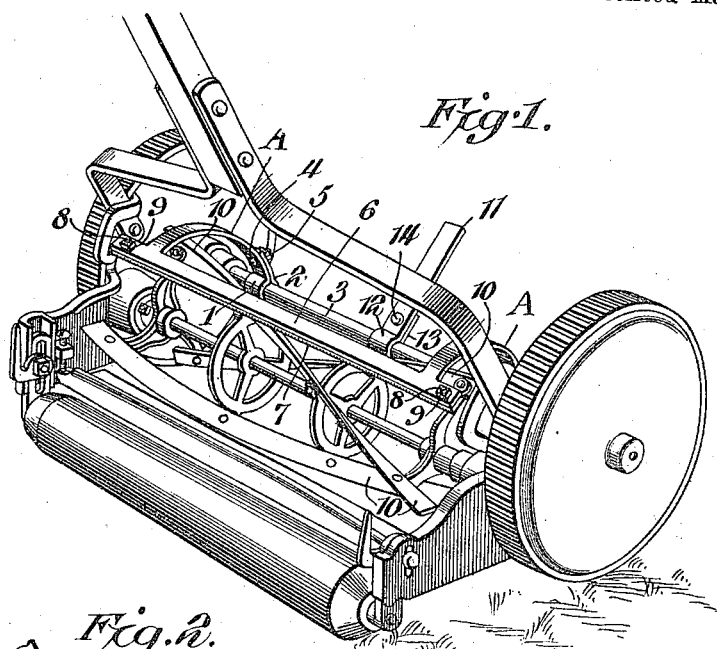
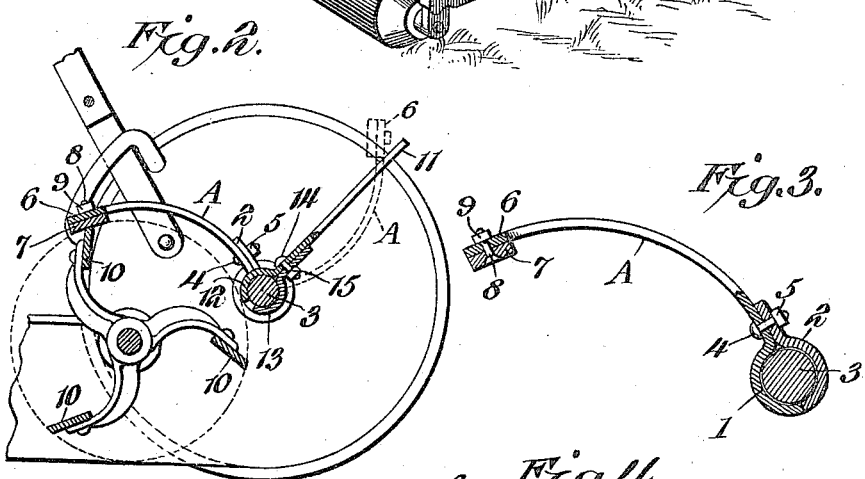
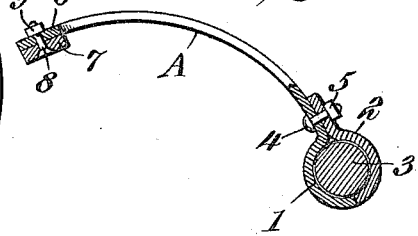
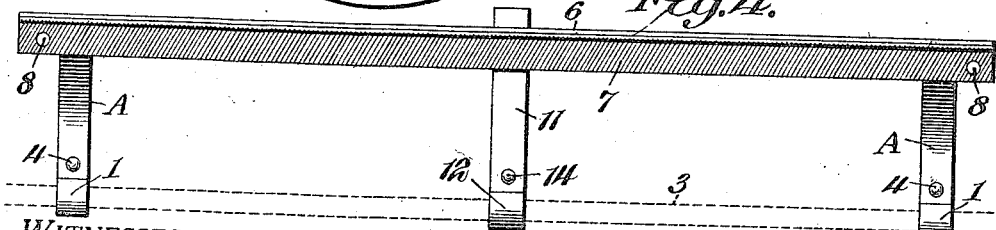
WITNESSES:
Howard D. Orr.
Watts T. Estabrook
Jacob W. Oswald, INVENTOR,
BY E. G. Siggers.
Attorney

UNITED STATES PATENT OFFICE.

JACOB W. OSWALD, OF CONEMAUGH, PENNSYLVANIA.

DEVICE FOR SHARPENING LAWN-MOWERS.

1,183,224.  Specification of Letters Patent.  Patented May 16, 1916.

Application filed August 11, 1915. Serial No. 44,939.

*To all whom it may concern:*

Be it known that I, JACOB W. OSWALD, a citizen of the United States, residing at Conemaugh, in the county of Cambria and State of Pennsylvania, have invented a new and useful Device for Sharpening Lawn-Mowers, of which the following is a specification.

This invention relates to an improvement in sharpening devices for lawn mowers, and the object is to provide means for sharpening the blades of a lawn mower which can be easily and quickly attached to a lawn mower of ordinary construction for the purpose of sharpening the knives or blades during the operation of the lawn mower.

A further object is in the provision of means for the supporting of the sharpening means when not in use.

The invention consists of certain novel features of construction and combination of parts which will be hereinafter described and pointed out in the claims.

It is evident that various changes in the form, proportion, size and minor details of construction within the scope of the appended claims may be resorted to without departing from the spirit and scope, or sacrificing any of the advantages of the invention.

In the accompanying drawings:—Figure 1 is a view in perspective showing the invention applied to a lawn mower; Fig. 2 is a transverse vertical sectional view; Fig. 3 is a view in side elevation of one of the brackets and showing in section the manner of connecting the bracket to the axle or shaft of the lawn mower and to the file or sharpener; and Fig. 4 is a view in elevation of the brackets and the sharpener and the means for supporting the sharpener when in an inoperative position.

Like numerals of reference designate corresponding parts in all of the figures of the drawings.

A, A represent two curved brackets, each being provided with a semi-circular seat 1 coöperating with clips 2 whereby the brackets may be clamped loosely upon a portion of the frame such as the axle or shaft 3 of an ordinary lawn mower. The clip 2 is connected to each bracket A by means of a bolt 4 and nut 5. The semi-circular seat 1 and the clip 2 connect the bracket to the axle or shaft 3 and form a pivotal mounting so that the bracket is maintained upon the axle and is permitted to swing or oscillate thereon. The upper terminals of the brackets A are integrally connected with a cross bar 6. Supported on the inner face of the cross bar 6 is a file or sharpener 7. This file or sharpener 7 is fastened to the cross bar 6 by means of bolts 8 and nuts 9, the heads of the bolts 8 being countersunk so as not to interfere with the sharpening surface of the file. The file or sharpener 7 is adapted to engage the blades or knives 10 for causing the knives to be sharpened as they are rotated during the cutting operation. The file or sharpener is held in engagement with the knives by gravity by reason of the fact that the center of gravity of the brackets is beyond the vertical plane of the shaft 3, and there is no danger of the file falling between the blades, as the file will be engaged by an adjacent knife or blade prior to its disengagement from the blade on which it is operating.

A stop in the form of a plate or post 11 is provided with a semi-circular seat 12 coöperating with a clip 13 for fastening the stop to the axle 3. A bolt 14 and nut 15 securely and firmly fasten the stop to the axle or shaft for maintaining the stop in its adjusted position. The stop 11 may be adjusted upon the axle for holding it at any desired angle, and is intended to engage the cross bar 6 of the sharpening device for supporting and maintaining the sharpening device out of engagement with the knives or blades of the cutter of the lawn mower.

When it is desired to bring the sharpener or file 7 into engagement with the knives 10, the brackets A and cross bar 6 are swung inwardly, and when the sharpener or file 7 is in this position it will be supported by the knives or blades of the cutter. When the blades have been sufficiently sharpened, the brackets A, cross bar 6, and sharpener 7 can be swung outwardly by the hand or foot of the operator, causing the bar 6 to engage the stop 11, which will support the sharpening device in its inoperative position.

From the foregoing it will be seen that I have provided a construction which consists of few parts and which can be readily applied to or removed from a lawn mower. Furthermore the sharpening device can be manufactured at a small cost and can be applied to practically all standard makes of lawn mowers, as the axle or shaft 3 is common to all lawn mowers.

What is claimed is:

1. The combination with the axle of a lawn mower, of upwardly curved brackets, means connected to the inner end of the brackets for freely pivoting them to the axle longitudinally of the knives of the mower, a cross bar connected to the outer ends of the brackets, and a straight sharpening file connected to the face of the cross bar and arranged normally in the path of rotation of said knives and engaging the latter above the horizontal plane of the axle, said brackets having their center of gravity beyond the vertical plane of the said pivotal mounting, whereby said file will be held in engagement with said knives by gravity.

2. The combination with a lawn mower, of brackets freely pivoted to a fixed part of the mower, a file connected to the outer terminals of the brackets and held in contact with the knives of the mower by gravity, and means connected to the mower to support the brackets and file when thrown out of engagement with the knives.

3. The combination with the axle of a lawn mower, of brackets freely pivoted to the axle, a cross bar connected to the outer terminals of the brackets, a file detachably connected to the face of the cross bar and held in one position in contact with the knives of the mower by gravity and in another position out of engagement with the knives, a stop, and a clip for rigidly connecting the stop to the axle, said stop supporting the brackets and file when in an inoperative position.

4. The combination with the axle of a lawn mower, of brackets carrying a file, means for freely pivoting the brackets to the axle so that the file is held in one position by gravity in engagement with the knives on the lawn mower, and in another position out of the path of the knives, and a stop for the brackets and file when in an inoperative position.

In testimony, that I claim the foregoing as my own, I have hereto affixed my signature in the presence of two witnesses.

JACOB W. OSWALD.

Witnesses:
J. B. ZINK,
W. H. CRUM.

Copies of this patent may be obtained for five cents each, by addressing the "Commissioner of Patents, Washington, D. C."